INVENTORS
Johannes MICHAEL
Werner WENZEL

ATTORNEY

United States Patent Office 3,521,322
Patented July 21, 1970

---

3,521,322
CONVEYOR BELT FOR GRIPPING AND CARRYING FISH
Johannes Michael, Harmsdorf Uber Ratzeburg, and Werner Wenzel, Lubeck, Germany, assignors to Nordischer Maschinenbau Rud. Baader, Lubeck, Germany
Filed Mar. 8, 1967, Ser. No. 621,683
Int. Cl. A22c 25/08
U.S. Cl. 17—55                           8 Claims

ABSTRACT OF THE DISCLOSURE

A conveyor belt for the slip-free gripping of the skin of a fish having a gripping surface consisting of a large number of gripping points disposed in several superposed rows so arranged as to seize the fish in the scale pockets and carry it along, the points preferably being inclined in the moving direction of the belt.

---

The present invention relates to a fish conveyor and more specifically to the construction of a conveyor belt for gripping the sides of fish or fish fillets.

In the conveying of fish by means of belts, past tools used in fish processing machines, particularly where the fish is conveyed longitudinally between a pair of belts supported by pulleys, the primary requirement lies in safely conveying the fish so that a perfect processing thereof be obtained and obstructions presented. Conveying of the fish may be called safe if the fish is seized in such a manner that there is no slipping of the belt or that no single fish portions get displaced with respect to one another.

Conveyor chains provided with spikes and conveyor belts provided with nails or spikes are known wherein the spikes penetrate through the fish skin. The former have the disadvantage that they do not adjust to the longitudinal shape of the fish; in the latter there is the danger that, by unsteady conveying, the fish may be damaged.

Both conveying means have this in common that the flesh of the fish may be infected at each point by the spike points, that the fish are ill supported and not carried between the spikes, and that displacement of the zones which are not supported by the spikes (for example belly and back), with respect to those supported, cannot be prevented. The fish are thus subjected to shearing stresses between the single muscle portions, which impair the quality of the end product.

Belts are also known in which the surface is provided with saw teeth arranged transversely of the conveying direction and which allow a uniform application of the force over the whole length of the fish, without damaging the fish flesh. They are successfully used where displacement along the height of the fish is necessary during processing thereof. The saw-tooth edges must thus allow slip-free conveying.

However, this saw-toothed surface provides safe gripping only at a relatively high pressure and if the tools do not cause too high a cutting resistance. A considerable increase of the conveying speed is not possible with conveyor belt of this kind.

The purpose of the present invention is to improve the conveying of fish or fish fillets by belts, in order to obtain a higher performance at a lower pressure. The technical task consists in providing conveyer belts which carry the fish without slipping, even at high speeds.

The invention relates therefore to a conveyor belt for the slip-free gripping of the skin side of fish or fish fillets, which is characterized in that the conveying surface consists of a large number of gripping pointed projections arranged in several superposed rows so disposed as to seize the fish in the scale pockets.

The use of conveyor belts having surfaces of this kind, allow a highly increased belt velocity and, thus, an increase in the number of fish processed per unit of time, as well as the use of circular knives operating in the direction against the fish and providing a smoother cut.

The invention will now be further described with the help of the appended drawings of preferred embodiments.

Figure 3:
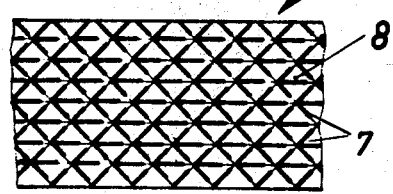
FIG. 3 is a top view of a belt surface according to the invention provided with pointed projections having profiles along straight inclined lines across the belt.
Figure 6:
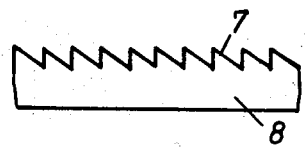
FIG. 6 is a side view of the belt of FIG. 3 in the direction of the arrow VI.

FIG. 3 of the drawings shows a belt base 8 having pyramidal projections 7 arranged in several parallel and intersecting rows. As shown in FIG. 6, viewed from the side, the projections 7 will have the shape of saw teeth. However, in cross-section shown in FIG. 5, the pyramidal shape of the projections is clearly apparent. In the case of a flexible conveyor belt, the projections 7 may be shaped out of the belt material; this may be done in the vulcanizing mold or by grinding the finished belt.

Figure 4:
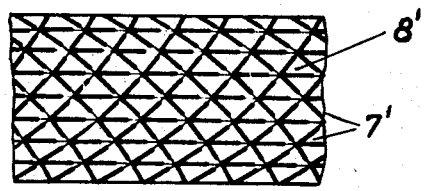
FIG. 4 is a top view of a belt surface similar to that of FIG. 3 but where the projections form curved inclined lines across the belt.

A belt base 8 will have a particularly good grasp if its surface is provided with criss crossing saw-tooth projections which form rhombic or square saw-tooth pyramids. If the pointed projections are obtained by grinding, it is found advantageous to arrange them along curved transversely inclined lines as in FIG. 4, as compared to the straight transversely inclined lines of FIG. 3. FIG. 4 shows curved lines of pyramidal projections 7' carried by a belt base 8'.

Depending on the kind of fish, the pitch of the saw-tooth profile may be, for example, between 3 and 7 mm. The belt surface will have a particularly good grasp if the tips of the saw-tooth pyramids are inclined in the conveying direction. With other kinds of fish, or with more rigid conveyor belts, it may be advantageous to provide the projections as closely arranged needles which may be made of tempered wire or of wire having hardened tips. in the conveying direction, there is obtained a surface having an excellent grasp, which ensures a slip-free conveying of the fish. The effectiveness of a belt provided with a large number of projections is due to the fact that these projections catch in the scale pockets of the fish skin, pockets which are produced by the fall of scales during previous fish-handling operations. It should be pointed out in this connection that in a live fish its scales are located in depressions provided in its skin. When the fish is dead and its body is subjected to various operations, its scales fall off, leaving depressions having the shape of pockets.

Figure 7:
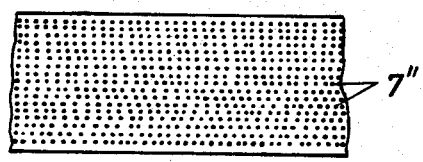
FIG. 7 is a top view of a belt surface provided with needle rows.
Figure 8:
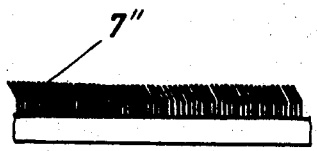
FIG. 8 is a front view of a part of the needle belt of FIG. 7.

The distance between the needles may be adjusted according to the kind and size of the fish. For herrings, distances between 1 and 3 mm. have proved suitable. For fish having a very delicate skin, the belt is provided with projections, the tips of which are ground to form flat surfaces, such surfaces lying in a common plane. These projections 7 "shown in FIGS. 7 and 8 consist of steel wires or needles the tips of which have been flattened by grinding.

Figures 5, 9:
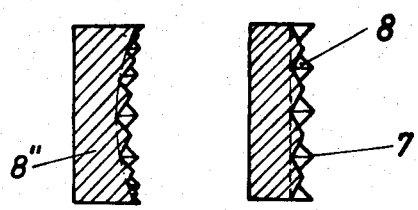
FIG. 5 is a cross-section through a conveyor belt provided with projections in the shape of pyramids.
FIG. 9 is a cross-section through a conveyor belt provided with pyramidal projections, the belt having a concave surface.

For certain kinds of fish it may be advantageous that the base 8" of the belt be, for example, made transversely concave, as in FIG. 9, to agree wtih the cross-section of the fish.

Figure 1:
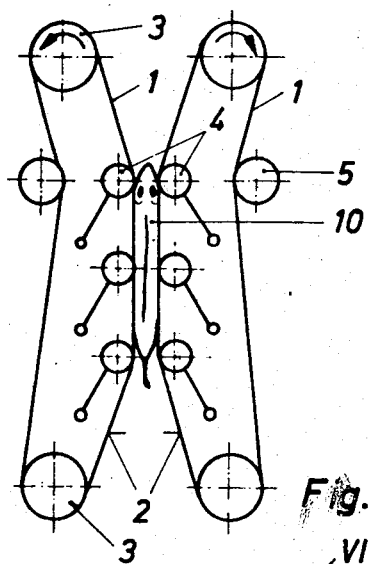
FIG. 1 is a top view of a known arrangement of conveyor belts for fish.

In the drawing, FIG. 1 shows two upright endless conveyor belts 2 winding around main pulleys 3 and brought closely together in parallel relationship to define a fish guiding channel by a set of spring pressed upright rollers 4. Idler rollers 5 are used to keep the belts taut.

Figure 2:
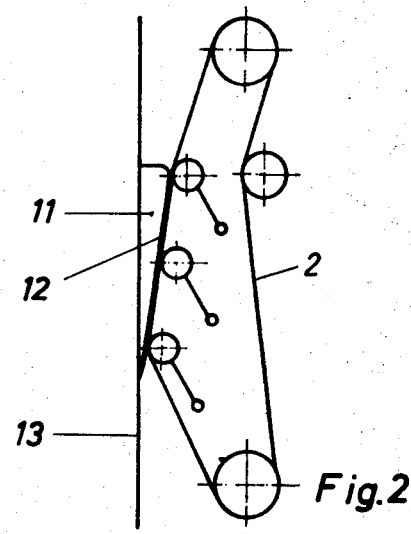
FIG. 2 is a corresponding view of an arrangement for fish fillets.

In FIG. 2 for use with fish fillet 11, one of the belts is replaced by an upright solid support 13 while the fish skin side 12 rests against the conveyor belt 2.

We claim:
1. A fish or fish fillet conveyor, comprising at least one traveling belt, a member located opposite a portion of said belt, whereby a fish conveying space is formed between opposed surfaces of said belt and said member and means pressing said belt in the direction toward said member, wherein said belt comprises an elongated flexible base and a plurality of densely distributed small pointed projections extending upwardly from said base in a plurality of uninterrupted intersecting rows disposed one next to the other substantially fully across said base, the size and spacing of said projections enabling said projections to penetrate into scale pockets of a fish body located in said space and preventing said projections from piercing the flesh or skin of the fish body.

2. A conveyor belt according to claim 1, wherein said projections are in the shape of pyramids distributed like the scales of the fish to be conveyed.

3. A conveyor belt according to claim 2, wherein the tips of said projections are inclined in the travelling direction of said belt.

4. A conveyor belt according to claim 2, wherein said pyramids are shaped like saw-teeth in side view, and are disposed along straight lines transversely of said base.

5. A conveyor belt according to claim 2, wherein said pyramids are shaped like saw-teeth, in side view, and are disposed along curved lines transversely of said base.

6. A conveyor belt in accordance with claim 1, wherein said projections are closely spaced needles having tips directed in the traveling direction of the belt.

7. A conveyor belt according to claim 6, wherein the tips of said needles are ground to a flat surface, said surfaces lying in a common plane.

8. A conveyor belt according to claim 1, wherein said base has a concave cross-section, to generally conform to the cross-section of the fish.

References Cited

UNITED STATES PATENTS

| 2,466,614 | 4/1949  | Rivers     | 17—3      |
| 1,718,812 | 6/1929  | Doney      | 17—2      |
| 2,694,834 | 11/1954 | Dodenhoff  | 198—198   |
| 2,861,673 | 11/1958 | Sandganger | 198—193 X |
| 2,909,271 | 10/1959 | Taylor     | 198—198   |
| 3,003,186 | 10/1961 | Eriksen    | 17—3      |

FOREIGN PATENTS 1,023,148  12/1952  France.

OTHER REFERENCES

German printed application, 1,116,358, Nov. 2, 1961, Baader.

LUCIE H. LAUDENSLAGER, Primary Examiner

U.S. Cl. X.R.

198—198